3,546,193
PROCESS OF POLYMERIZATION IN AQUEOUS EMULSION FOR OBTAINING VINYL CHLORIDE POLYMERS OR COPOLYMERS ADAPTED TO FORM FLUID EASILY DEAERATABLE PASTES
Gianni Benetta, Mestre, Valerio Bresquar, Padova, Giorgio Gatta, Mestre, and Francesco Testa, Padova, Italy, assignors to Montecatini Edison S.p.A., Milan, Italy
No Drawing. Continuation of application Ser. No. 257,874, Feb. 12, 1963. This application Feb. 15, 1968, Ser. No. 705,859
Claims priority, application Italy, Feb. 19, 1962, 683,981; Oct. 19, 1962, 20,588/62
Int. Cl. C08f *1/13, 3/30*
U.S. Cl. 260—92.8
3 Claims

ABSTRACT OF THE DISCLOSURE

The invention is a process for polymerization in aqueous emulsion of vinyl chloride by the technique of seeding and in the presenie of a water-soluble persulfate as a catalyst, in which a mixture of at least two emulsifiers is used, at least one being selected from the group consisting (1) of alkali metal alkyl sulphates, where the number of carbon atoms in the alkyl radical is between 12 and 17, (2) of alkali metal salts of alkyl naphthalines and alkyl benzines, where the number of carbon atoms in the alkyl radical is between 3 and 12, and (3) of alkali metal salts of sulfonated paraffins, and the other is selected from the group consisting of alkali metal salts and ammonium salts of esters of sulfo-carboxylic acids, the emulsifier mixture being added continuously during the course of polymerization.

---

This application is a continuation of application Ser. No. 257,874, filed Feb. 12, 1963, now abandoned.

The present invention relates to an improved process of polymerization and copolymerization in aqueous emulsion of vinyl chloride in order to obtain a product exhibiting characteristics proper to form fluid pastes (plastisols) with particularly low viscosity.

With the usual processes of polymerization of vinyl chloride in aqueous emulsion by the well known technique of seeding, a seed latex is previously prepared which is characterized by small and uniform particles and is charged into the autoclave of polymerization in the presence of water, emulsifier and buffer substance, in addition to the vinyl monomer, to obtain a final latex having particles of larger size and distributed within a wide interval.

It is an object of the present invention to provide an easily controllable process for the aqueous emulsion polymerization or copolymerization of vinyl chloride, yielding a product having general characteristics (such as molecular weight, heat resistance, easy mixing with the plastifier to yield pastes) such as to assure its easy and convenient applicability with normal streaking processes, immersion moulding, ejection moulding and rotational moulding. In particular the process according to the present invention leads to the production of a chloride polymer or copolymer which if mixed with plasticizers, such as for instance dioctylphthalate, produces very fluid dispersions or pastes showing such particularly low viscosities as to be preferred by the utilizers by some moulding processes.

It is another object of the present invention to provide such a rapid process for the polymerization or copolymerization of vinyl chloride in aqueous emulsion that more than 90% of the monomer becomes polymerized.

These and other objects are attained according to the present invention by polymerization or copolymerization in aqueous emulsion vinyl chloride with the seeding technique, by using a particular mixture of emulsifier which when suitably introduced into the reaction medium leads to the production of a vinyl chloride polymer or copolymer that if mixed with the usual plasticizers, such as for instance dioctyl phthalate, affords very fluid dispersions or pastes which may be easily and profitably used by the moulding processes as usually adopted by the skilled in the art.

It has now been found according to the present invention that if during the whole course of polymerization an emulsifier is added, which is constituted by a mixture of two emulsifiers of which one is selected from the following three classes:

(1) Alkali metal alkyl sulfates such as sodium or potassium lauryl sulfate, sodium tridecyl sulfate, sodium hexadecyl sulfate, sodium cetyl sulfate, sodium stearyl sulfate;
(2) Alkali metal salts of alkyl naphthalenes and alkyl benzenes (or poly alkyl naphthalenes) sulfonates (for instance sodium isopropyl naphthalene sulfonate, sodium dodecyl benzene sulfonate);
(3) Alkali metal salts of sulfonated paraffins;

and the other one is a member of the class of alkali metal salts or of ammonium salts of esters of sulfocarboxylic acids, then the so obtained polymer, if mixed with the usual plasticizers, shows excellent capacity to form fluid pastes with the plasticizers.

According to a preferred embodiment, the process according to the present invention foresees the charging into the autoclave of water, of a part of the seeding latex (prepared previously with analogous modalities) and of a buffer substance. The oxygen is completely removed from the autoclave, then the reducing agent is charged as well as a part of the monomer vinyl chloride. The temperature of the bath is brought up to the desired value and the polymerization is started by introducing continuously the catalyst and emulsifier solutions as well as the remainder monomer vinyl chloride. At the end of the polymerization, another portion of emulsion is introduced in order to stabilize the latex conveniently.

When the mixture of the emulsifiers is introduced all at the beginning of polymerization, the results that are obtained are completely different, since the number, the sizes and the distribution of the latex particles are deeply altered. Moreover if one of the two emulsifiers is introduced only at the end of the polymerization, whereas the other one is introduced continuously during polymerization (Ex. IV and V), the results that are obtained are even less good than when operating according to the invention.

As the esters of sulfocarboxylic acids in particular sulfosuccinic esters are advantageously used according to the invention.

It has been found that sulfosuccinic esters acts with greater effectiveness by increasing the number of carbon atoms of the alcohol which esterifies the carboxylic groups of succinic acid. So the best results are obtained by passing over butyl alcohol to amyl, hexyl, octyl, decyl and tridecyl alcohols. Alcohols higher than tridecyl are less convenient since thereby the solubility of the product in water is strongly decreased. For instance, the sodium sulfonate of stearyl succinate is completely insoluble in water.

Highly satisfactory results are attained in particular by using according to the invention a mixture of sodium lauryl sulfate and of sodium bis tridecyl sulfosuccinate.

The most advantageous quantities of salts of sulfosuccinic esters to be introduced during the course of polymerization are comprised between 0.1 and 2 parts by weight for 100 parts of monomer; amounts higher than 2 parts percent do not yield in fact much better results, whereas amounts lower than 0.1 part percent are sometimes insufficient to prevent, together with the lowest amount of the other emulsifier constituting the mixture, the coagulation of the latex.

The quantity of the other emulsifier (alkyl sulfate, alkyl sulfonate, sulfonated paraffins) constituting the mixture are advantageously comprised between 0.1 and 1 part by weight percent of monomer.

Moreover it has been found according to the invention that if instead of salts of alkali metals with the esters of sulfocarboxylic acids there are used the corresponding ammonium salts, there is obtained a vinyl polymer chloride or copolymer which if mixed with the usual plasticizers such as for instance dioctyl phthalate, is suitable to form pastes even more fluid than those obtainable with the use of corresponding alkali metal salts.

It is well known that normally the pastes obtained from the mixture of polyvinyl chloride in emulsion with the usual plasticizers incorporate air during the preparation and that this air is difficult to be eliminated spontaneously unless particular vacuum treatments are adopted.

The presence of air in the paste produces in the manufactured article, specially with the technique of rotational moulding, dipping etc. a great number of bubbles of various sizes with heavy prejudice from both the point of view of appearance and that of the mechanical characteristics It has been found that another considerable advantage obtainable through the use of said ammonium salts regards the possibility of obtaining easily deaeratable pastes and that may remove, without resorting to the usual deaerating techniques, almost totally the air incorporated during the preparation of the paste in such a manner that the manufactured article obtained is totally free from bubbles or other defects originating from the incorporation of air, which are known to the skilled in the art. Still another advantage regards the exceptional transparency and clearness of the manufactured product obtainable from polyvinyl chloride pastes prepared according to the present invention.

Very good results are obtained in particular by using according to the invention a mixture of sodium lauryl sulfate and of ammonium bis tridecylsulfosuccinate.

Further characteristics and advantages of the present invention are illustrated by the following examples.

EXAMPLE 1

A mixture of 7.5 parts of latex-seed with 35% solids with particle diameter of about 0.3 micron, 130 parts of water, 0.1 part of sodium bicarbonate are introduced into an enamelled autoclave of 500 litres capacity, equipped with heating and cooling means as well as with a stirrer. After having removed the air above the solution there are added, together with 0.1 part of sodium bisulfite, 20 parts of monomer vinyl chloride. The mass is brought up to 50° C. and the polymerization is started by introducing continuously, at a prefixed flow rate, a water solution of 0.02 part of potassium persulfate.

After about one hour there are introduced, again continuously, 80 parts of vinyl chloride and a solution formed by 0.25 part of sodium lauryl sulfate plus 0.5 part of sodium tridecylsulfosuccinate.

These solutions are distributed during the whole course of the reaction which generally lasts 6 to 7 hours. When nearly the total of the vinyl chloride monomer is consumed, there are introduced, in order to further stabilize the latex, 0.2 part of sodium bis tridecyl sulfosuccinate. The residual monomer is degassed and the emulsion is dried, for instance, with spray driers.

The resulting polyvinyl chloride (PVC) is a white powder which after mixing with 60 parts of dioctyl phthalate (DOP) for 100 parts of polymer, produces a very fluid paste the apparent viscosity whereof, measured by the rotational viscosimeter of Brookfield, H.A.T. Model, gives the following values:

Viscosity of the paste, 25° C. at 2 hours ageing: 100 PVC, 60 DOP

R.p.m. of the viscosimeter:

| | Centipoises |
| --- | --- |
| 2.5 | 10,000 |
| 10 | 8,000 |
| 50 | 7,000 |
| 100 | 6,000 |

EXAMPLE 2

The Example 1 is repeated but for the quantity of sodium bis tridecyl sulfosuccinate emulsifier introduced continuously during the polymerization, which is doubled.

The dried latex affords a polyvinyl chloride that forms with dioctyl phthalate a paste having an apparent viscosity not much different from that of Example 1.

R.p.m.:

| | Centipoises |
| --- | --- |
| 2.5 | 9,000 |
| 10 | 7,500 |
| 50 | 6,500 |
| 100 | 6,500 |

EXAMPLE 3

The Example 1 is repeated except for the emulsifier, namely sodium dioctyl sulfosuccinate is used instead of sodium bis tridecyl sulfosuccinate.

The paste obtained by mixing dioctyl phthalate (60 parts) with the polyvinyl chloride obtained (100parts) shows a much higher apparent viscosity.

R.p.m.:

| | Centipoises |
| --- | --- |
| 2.5 | 14,000 |
| 10 | 12,000 |
| 50 | 9,500 |
| 100 | 9,500 |

EXAMPLE 4

The Example 1 is repeated but the emulsifier introduced during polymerization is only lauryl sulfate in the amount of 0.4 part; the sodium bis tridecyl sulfosuccinate emulsifier in a quantity of 0.7 part is introduced only at the end of polymerization.

The polyvinyl chloride is mixed (100 parts) with dioctyl phthalate (60 parts) to give a paste whose apparent viscosity, measured by the Brookfield viscosimeter Mod. H.A.T. is as follows:

R.p.m.:

| | Centipoises |
| --- | --- |
| 2.5 | 16,000 |
| 10 | 12,800 |
| 50 | 9,600 |
| 100 | 9,200 |

EXAMPLE 5

The Example 1 is repeated but the emulsifier introduced during the polymerization is only lauryl sulfate, in the quantity of 0.4 part. The sodium dioctyl sulfosuccinate emulsifier in a quantity of 0.7 part is introduced all at the end of the polymerization. The polyvinyl chloride is mixed (100 parts) with dioctyl phthalate (60 parts) to give a paste whose apparent viscosity as measured by the Brookfield Model H.A.T. viscosimeter is as follows:

R.p.m.:

| | Centipoises |
| --- | --- |
| 2.5 | 26,000 |
| 10 | 16,500 |
| 50 | 11,500 |
| 100 | 11,000 |

EXAMPLE 6

Into an enamelled autoclave of 15,000 litres capacity there are introduced 580 kg. of latex seed with 35% solids content with particle size of 0.4 micron, 7400 kg. of water, 4500 g. of sodium bicarbonate. After removal of the air, there are introduced 7000 g. of sodium bisulfite, 1250 kg. of monomer vinyl chloride and continuously a solution containing 1 kg. of potassium persulfate.

When the first monomer vinyl chloride is used up, there are introduced continuously 5000 kg. of MCV and contemporaneously a solution of 30 kg. of sodium bis tridecyl sulfosuccinate and 16 kg. of sodium lauryl sulfate. The polymerization lasts 6 to 7 hours.

Towards the end of polymerization there are introduced, in order to stabilize the latex, 18 kg. of sodium bis tridecyl sulfosuccinate.

The residual monomer is degassed and the latex obtained is dried through a spray drier.

If 100 parts of this polymer are mixed with 60 parts of DOP there is obtained a paste whose apparent viscosity as measured by the Brookfield Model H.A.T. viscosimeter is as follows:

| R.p.m.: | Centipoises |
|---|---|
| 2.5 | 7,000 |
| 10 | 6,000 |
| 50 | 5,500 |
| 100 | 5,000 |

EXAMPLE 7

The Example 1 is repeated but the mixture of emulsifiers introduced continuously is formed by 0.4 part of sodium dodecyl benzene sulfonate with 80% solids content and by 0.5 part of sodium bis tridecyl sulfosuccinate.

The paste obtained by mixing dioctyl phthalate (60 parts) with the polyvinyl chloride obtained (100 parts) has the following apparent viscosity:

| R.p.m.: | Centipoises |
|---|---|
| 2.5 | 10,000 |
| 10 | 9,000 |
| 50 | 7,500 |
| 100 | 7,500 |

EXAMPLE 8

The Example 1 is repeated but the mixture of emulsifiers introduced continuously is constituted by 0.5 part of a sulfonated paraffin with 70% of active substance (e.g. the product known by the trade mark Emulgator MK which is constituted by a mixture of sulfonated $C_{12}$–$C_{16}$ paraffins and by 0.5 part of sodium bis tridecyl sulfosuccinate.

The paste obtained by mixing dioctyl phthalate (60 parts) with the polyvinyl chloride obtained (100 parts) shows the following apparent viscosity:

| R.p.m.: | Centipoises |
|---|---|
| 2.5 | 11,000 |
| 10 | 9,500 |
| 50 | 8,000 |
| 100 | 7,500 |

EXAMPLE 9

The Example 1 is repeated but for the only variant by using instead of the sodium salt, the ammonium salt of bis tridecyl sulfosuccinic acid, while using the same quantities by weight. The polyvinyl chloride resulting after mixing with 60 parts of dioctyl phthalate for 100 parts of polymer, produces a very fluid paste whose apparent viscosity as measured by the rotational Brookfield viscosimeter Model H.A.T., gives the following values, after an ageing of 2 hours at 25° C.

| R.p.m. of viscosimeter: | Centipoises |
|---|---|
| 2.5 | 8,000 |
| 10 | 7,000 |
| 50 | 5,000 |
| 100 | 4,800 |

If this paste is kept for 20 minutes at 180° C. in a suitable vessel, there is obtained a gelified product having particular transparency and clearness.

Moreover, if the polymer is mixed in a planetary mixer, accordance to the following recipe:

Polyvinyl chloride 100 parts, dioctyl phthalate 60 parts, dioctyl adipate 20 parts, epoxydic plasticizer (Paraplex G 60 registered trademark) 5 parts, heat stabilizer (Mark BB of Argus Chemical Corp.) 2 parts; there is obtained, with extreme easiness, a paste having high fluidity.

On the surface of this paste the rapid formation of surface foams can be observed which rapidly and continual break up, which indicates that the release of the incorporated air happens spontaneously and easily.

Moreover if the paste is transformed into a manufactured article by the technique of rotational moulding, for instance, producing dolls, there are obtained products which at sight show almost complete absence of inner or surface bubbling.

If the same test is carried out with polyvinyl chloride of normal industrial production whose paste has not undergone the deaerating treatment there are obtained generally manufactured articles containing in different but always remarkable amounts a great number of bubbles of various sizes.

EXAMPLE 10

The Example 9 is repeated with the only variant that the emulsifier used is the ammonium salt of dioctylsulfosuccinic acid in amount of 0.4 part by weight on 100 of MCV during the course of polymerization and in the amount of 0.35 part by weight at the end of polymerization. The paste obtained by mixing dioctyl phthalate (60 parts) with the polyvinyl chloride obtained (100 parts) shows a viscosity slightly higher than that obtained in Example 9.

| R.p.m. of the viscosimeter: | Centipoises |
|---|---|
| 2.5 | 8,500 |
| 10 | 7,600 |
| 50 | 6,000 |
| 100 | 5,500 |

The melting behaviour of this mixture is analogous to that of the product obtained by Example 9.

Finally if the polyvinyl chloride obtained is mixed according to a recipe of the following kind:

Polyvinyl chloride 100 parts; dioctyl phthalate 60 parts; dioctyl adipate 20 parts; epoxide plasticizer (Paraplex G 60 registered trademark) 5 parts; heat stabilizer (Mark BB of Argus Chemical Corp.) 2 parts; it forms a paste whose behaviour in both the removal of the incorporated air and the production of manufactured articles free from bubblings, is quite analogous to the behaviour of the polyvinyl chloride obtained by the procedure of Example 9.

We claim:

1. In a process for the emulsion polymerization of a vinyl-chloride monomer to produce a flowable, easily deaeratable vinyl-chloride polymer paste in which the monomer and an inorganic water-soluble catalyst capable of emulsion-polymerization of the monomer are added continuously to a reactor containing a seed latex, water and a buffering agent, the improvement which consists of:
   continuously adding to said reactor, together with the monomer, an emulsifying mixture consisting of at least two emulsifiers, one of said emulsifiers being selected from the group which consists of alkali-metal alkanesulfates having an alkyl radical with 12 to 17 carbon atoms, alkali-metal salts of alkylnaphthalene sulfonates having an alkyl radical with 3 to 12 carbon atoms, alkyl benzene sulfonates having an alkyl radical with 3 to 12 carbon atoms and alkali-metal satls of sulfonated paraffins, the other of said emulsifiers being an alkali metal salt or an ammonium salt of a sulfocarboxylicacidester.

2. The improvement defined in claim 1 wherein said one of said emulsifiers is sodium lauryl sulfate and the other of said emulsifiers is sodium or ammonium bis-tridecyl sulfosuccinate.

3. The improvement defined in claim 2 wherein said one of said emulsifiers is supplied to said vessel during polymerization of the vinyl chloride in an amount between 0.1 to 1 part per 100 parts by weight of the vinyl-chloride monomer and said other of said emulsifiers is supplied to said vessel in an amount between 0.1 and 2 parts by weight per 100 parts by weight of the vinyl-chloride monomer.

References Cited

Schildnecht, C. E.: Polymer Processes Polymerization in Emulsion, Interscience Publishers Inc., New York, 1956, pp. 152–153.

JOSEPH L. SCHOFER, Primary Examiner

J. A. DONAHUE, JR., Assistant Examiner

U.S. Cl. X.R.

260—87.5